(No Model.)
J. M. CHAMPE.
CHURN.
No. 321,688. Patented July 7, 1885.
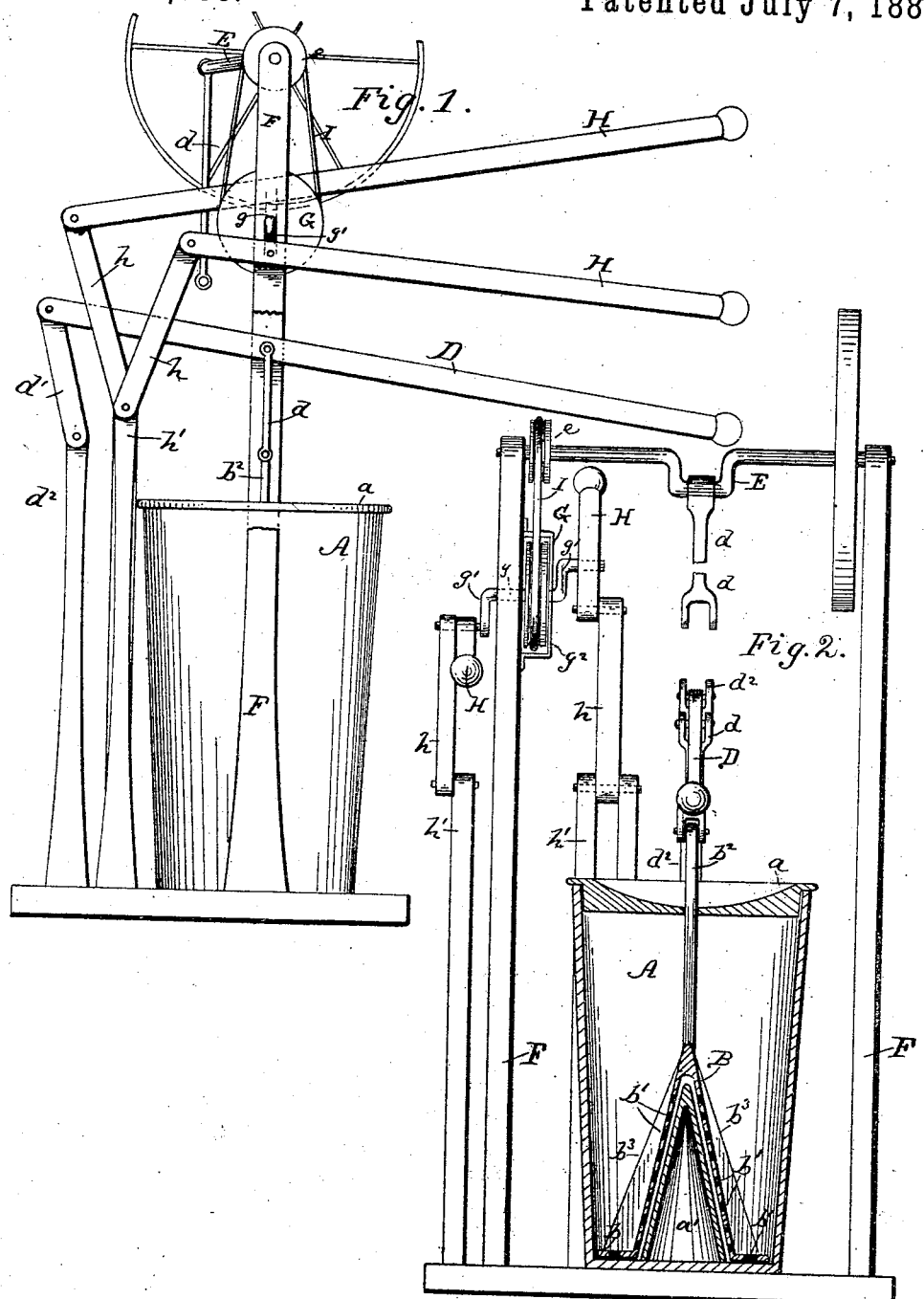
WITNESSES:
Thos Houghton.
John C. Kenon
INVENTOR:
J. M. Champe
BY Munn & Co.
ATTORNEYS.

United States Patent Office.

JAMES MONROE CHAMPE, OF LITCHFIELD, ILLINOIS.

CHURN.

SPECIFICATION forming part of Letters Patent No. 321,688, dated July 7, 1885.

Application filed February 18, 1885. (No model.)

*To all whom it may concern:*

Be it known that I, JAMES MONROE CHAMPE, a citizen of the United States, residing at Litchfield, in the county of Montgomery and State of Illinois, have invented a certain new and useful Improvement in Churns, of which the following is a description.

Figure 1 is a side elevation of my improved churn and levers for operating it. Fig. 2 is a front view of the same, showing the churn in section through the center.

My invention relates to churns; and it consists in the detailed construction and combination of the parts, hereinafter fully described, by which the operation of butter-making is performed with less labor and in a shorter space of time than by other means at present in use, and by which the butter when made can be easily removed from the churn, the entire interior surface of which is then readily accessible for cleaning.

I will now proceed to describe my invention with reference to the accompanying drawings, in which similar letters of reference indicate corresponding parts in both figures.

A is the churn, consisting of a cylindrical vessel made rather smaller in diameter at the bottom than at the top, provided with the lid $a$, fitting the top closely, and with the cone $a'$ in the bottom of the churn.

B is the dasher, consisting of a cone provided with the flange $b$ round the bottom. A series of holes, $b'$, are formed in the cone and in the flange. $b^2$ is a rod passing through the lid of the churn and attached to the apex of the said cone, for working the dasher up and down in the churn. This action causes the milk to be violently agitated and to pass back and forth through the holes in the dasher. Braces $b^3$ are provided for securing the flange $b$ firmly to the cone. This form of churn is suitable for small sizes, and can be worked by the rod $b^2$. When the churn is made of larger size, I provide the lever D, and attach it to the rod $b^2$ by the connecting-link $d$. The other end of the lever is pivoted in the link $d'$, which in turn is pivoted to the standard $d^2$. For very large sizes of churns, where the lever described will not be powerful enough to work the dasher or to attain sufficient speed, I attach the rod $b^2$ to the crank E by means of the connecting-link $d$.

F are standards in which the said crank is journaled.

$e$ is a pulley fastened upon the crank-shaft for driving crank E.

G is a pulley fastened upon the crank-shaft $g$, provided with single cranks $g'$, and journaled in the bracket $g^2$ and in the standard to which the said bracket is attached.

H are levers for working the said cranks $g'$. $h$ are connecting-rods, which connect the ends of levers H with the standards $h'$. The motion of the levers H is conveyed through the cranks $g'$ and pulley G to the pulley $e$ by the belt I. The flange of the dasher is made to fit closely in the bottom of the churn, but fits loosely when raised, owing to the tapered form of the sides of the vessel. This makes the dasher very easy to work. The smallest sizes of churn may be used for other purposes besides making butter, such as beating eggs and mixing various liquids. On very large churns I sometimes attach fly-wheel to the crank-shaft which works the dasher, and this I place on the end of it opposite to the pulleys from which it receives its rotary motion.

Having thus described my invention, what I claim as new, and desire to secure by Letters Patent, is—

1. In a churn, the combination, with the dasher-rod and the standards F F $h'$, of the crank-shaft E, journaled in the standards F, the connecting-rod $d$, pulley $e$ on crank-shaft E, band I, pulley G, shaft $g$, journaled in one of the standards F, and provided with the cranks $g'$, the levers H, and the links $h$, pivoted to the standards $h'$ and to the end of the levers H, substantially as herein shown and described.

2. The combination of vessel A, having lid $a$ and cone $a'$, conical dasher B, having holes $b'$ therein, rod $b^2$, link $d$, standards F, pulleys $e$ and G, cranks E and $g'$, levers H, links $h$, and standards $h'$, substantially as shown and described, and for the purpose set forth.

JAMES MONROE CHAMPE.

Witnesses:
JOHN F. HAYS,
FRIEDRICK JOUNOY.